(No Model.)
J. L. SCHUMAN.
CAR FENDER.
No. 553,266. Patented Jan. 21, 1896.
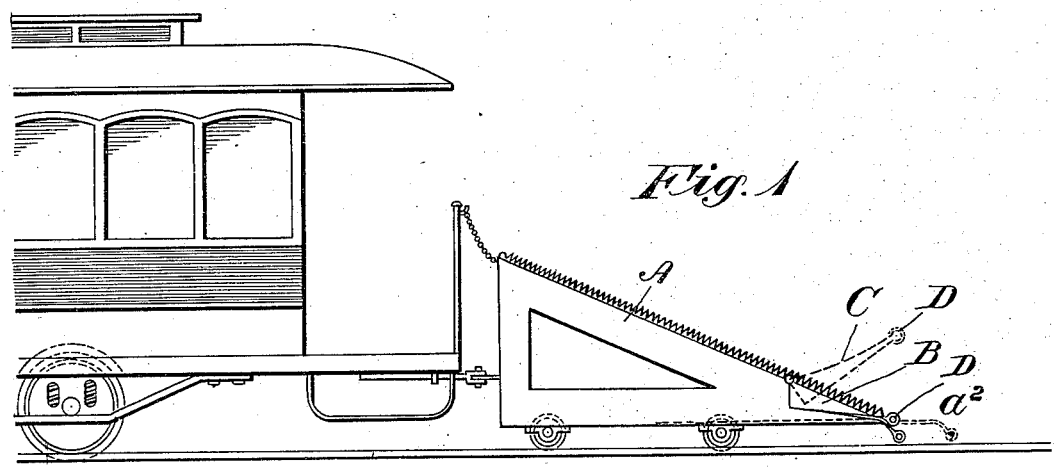
Fig. 1
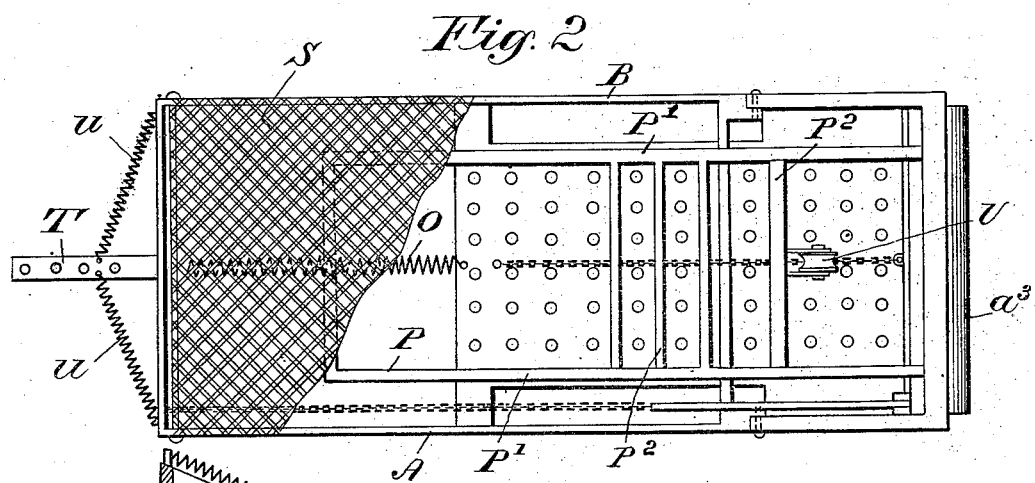
Fig. 2
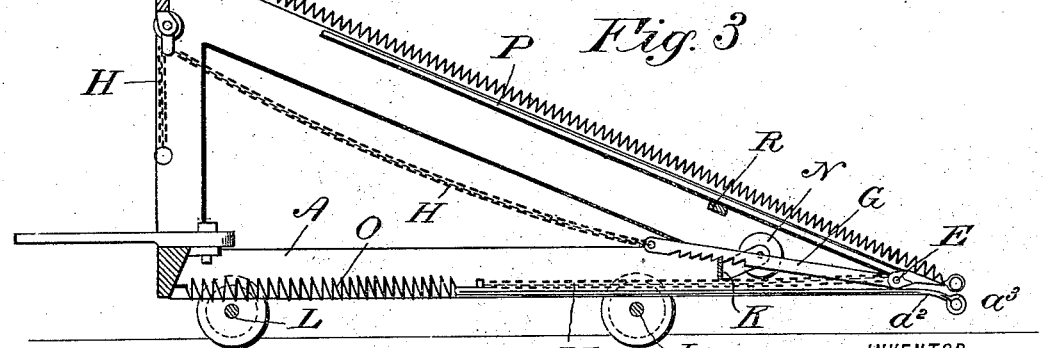
Fig. 3
Fig. 4
WITNESSES: M. B. Harris, L. M. Muller
INVENTOR
Jacob L. Schuman
BY Edgar Tate & Co
ATTORNEY

UNITED STATES PATENT OFFICE.

JACOB L. SCHUMAN, OF NEW YORK, ASSIGNOR OF ONE-THIRD TO STUART F. CLARK, OF KINGSBRIDGE, NEW YORK.

CAR-FENDER.

SPECIFICATION forming part of Letters Patent No. 553,266, dated January 21, 1896.

Application filed July 30, 1895. Serial No. 557,606. (No model.)

*To all whom it may concern:*

Be it known that I, JACOB L. SCHUMAN, a citizen of the United States, and a resident of New York, in the county of New York and State of New York, have invented certain new and useful Improvements in Car-Fenders, of which the following is a specification, reference being had to the accompanying drawings, forming a part thereof, in which similar letters of reference indicate corresponding parts.

This invention relates to fenders or guards for tramway-cars, and the object thereof is to provide an improved device of this class which is simple in construction and operation and which involves the employment of a truck of novel form and construction which is adapted to be coupled to or connected with the end of a car and to be propelled in front thereof; and with this and other objects in view the invention consists in the construction, combination and arrangement of parts hereinafter described and claimed.

The invention is fully disclosed in the following specification, of which the accompanying drawings form a part, and in which—

Figure 1 is a side elevation of the end of a car provided with my improvement; Fig. 2, a plan view of the fender or guard; Fig. 3, a sectional side view thereof, and Fig. 4 a sectional detail of the construction.

In the practice of my invention I employ a truck which is substantially in the form, when viewed from the side, as in Fig. 1, of a right-angled triangle, and the short side of the triangle constituting the rear end of the truck and the inclined surface thereof constituting the upper part of the truck. This truck is composed of side frames A, each of which constitutes a right-angled triangle, the point of which projects forward, and the forward upper portion thereof is cut away, so as to form a triangle space B, in which is hinged a supplemental frame C, which is composed of side bars, which are also triangular in form, the forward end of which is provided with a transverse rod on which is mounted a rubber covering or roller D, and slightly back of said roller D, on the under side of the supplemental frame, is mounted a rod E, with which is connected a rack-bar G, with the inner end of which is connected a chain H, which extends backwardly to the rear end of the truck, and is supported near the top thereof in any desired manner.

The rack-bar G has teeth or projections on its under surface adapted to operate in connection with a vertical cross-plate K, secured to the lower part of the main truck-frame, and said main truck-frame is also provided with trucks L, consisting of the usual axles and wheels connected therewith, which are adapted to travel on the rails of the track, as will be readily understood, and connected centrally with the cross-bar E of the supplemental frame is a chain M, which passes backward beneath the roller N supported on and centrally of the bottom of the main truck-frame, and this chain M is connected at its inner or rear end with a strong spiral spring O, which is carried and connected with the rear end of the main truck-frame. Pivotally connected also with the forward end of the supplemental fender-frame C is an operative frame P, consisting of side bars P' and cross-bars P², which extends backward within the main truck and is adapted to rest on a transverse bar R connected with the main frame, as shown in Fig. 3.

The sides of the main truck-frame are provided at the bottoms thereof with inwardly-directed extensions $a$, in which are formed longitudinal slots $a'$, in which slides a bottom plate $a^2$, the forward end of which projects in front of the fender or guard truck, as shown in Fig. 1, and also Fig. 3, and is curved downwardly and also provided with a rubber buffer or roller $a^3$, and the rear end of this plate $a^2$ is connected with the spring O, and if desired the chain M may be connected with the rear end of this plate, or with the spring O, as may be preferred.

The upper portion of the truck-frame is composed of wire netting or mesh S in the usual manner, which extends over the supplemental frame C, or in place thereof longitudinal interwoven wire spring may be employed; and connected with the coupling-bar T, by which the fender or guard truck is connected with the car, are side springs U, which are connected on their opposite sides with the opposite sides of the truck-frame, as clearly shown in Fig. 2, the object of this arrangement being to provide means to guide the truck-frame when the car is moving on a curve or turning the same.

The operation will be readily understood from the foregoing description when taken in connection with the accompanying drawings. The fender or guard truck is coupled with a car, as shown in Fig. 1, and if a person or object should be struck thereby when the car is in motion said person or object will be thrown upon the fender or guard, and striking upon the frame P the supplemental frame C will be raised thereby into the position shown in Fig. 1, and the inner end of the said frame P will be depressed and said person or object will be held in and supported by the net-work S, which in this position will constitute a sort of a basket or receptacle for this purpose, and at the same time the sliding frame or plate $a^2$ will be projected, as shown in dotted lines, Fig. 1, and the passage of a person or object beneath the car will be rendered impossible. When it is desired to restore the parts to their normal position it is only necessary to pull forward on the chain H, when the supplemental frame, together with the sliding plate $a^2$, will be drawn back by the spring O, as will be readily understood, and it will thus be seen that I accomplish the object of my invention by means of a device which is simple in construction and operation and well adapted to accomplish the result for which it is intended.

It is evident that changes in the form, construction, combination, and arrangement of the various parts of my invention may be made without departing from the spirit thereof or sacrificing its advantages, and I therefore reserve the right to make all such alterations as fairly come within the scope of the invention.

Having fully described my invention, I claim and desire to secure by Letters Patent—

1. A guard or fender for tramway cars, consisting of a truck which is triangular in form in longitudinal vertical section, the forward end of which on the upper side is cut away forming a triangular space, in which is hinged a supplemental frame, said main truck or frame and supplemental frame being provided with a covering of wire netting or similar material and said supplemental frame being provided near its outer end with a cross rod with which is connected centrally thereof a chain or cord which extends backward, and passes under a pulley and is connected at its inner end with a spring, substantially as shown and described.

2. A guard or fender for tramway cars, consisting of a truck which is triangular in form, in longitudinal vertical section, the forward end of which on the upper side is cut away forming a triangular space, in which is hinged a supplemental frame, said main truck or frame and supplemental frame being provided with a covering of wire netting or similar material, and said supplemental frame being provided near its outer end, with a cross rod with which is connected, centrally thereof, a chain or cord which extends backward, and passes under a pulley and is connected at its inner end with a spring, and a sliding frame or plate connected with the bottom of the truck or main frame, the rear end of which is connected with said spring and adapted to be operated thereby, whereby when the supplemental frame is thrown upward, the sliding frame or plate will be projected forward and returned to its normal position when the supplemental frame is lowered, substantially as shown and described.

3. A fender or guard for tramway cars, consisting of a truck which is triangular in form in longitudinal vertical section, and the front end of which is provided with a hinged supplemental frame, said supplemental frame being also provided with an auxiliary frame which is pivotally connected therewith and extended backward and adapted to rest upon a cross bar of the main frame, whereby the supplemental frame may be raised or thrown upward, substantially as shown and described.

4. A fender or guard for tramway cars, consisting of a truck which is triangular in form, in longitudinal vertical section, and the front end of which is provided with a hinged supplemental frame, said supplemental frame being also provided with an auxiliary frame which is pivotally connected therewith and extended backward and adapted to rest upon the cross bar of the main frame, and whereby the supplemental frame may be raised or thrown upward, said supplemental frame being also provided with a rack bar which is connected therewith and extended backward and adapted to rest on a cross plate connected with the main frame, said bar being also provided with a chain which extends back and is adapted to be operated from the platform of the car, substantially as shown and described.

5. A fender or guard for tramway cars, consisting of a truck which is triangular in form in longitudinal vertical section and the front end of which is provided with a hinged supplemental frame, said supplemental frame being also provided with an auxiliary frame which is pivotally connected therewith and extended backward and adapted to rest upon the cross bar of the main frame, and whereby the supplemental frame may be raised or thrown upward, said supplemental frame being also provided with a rack bar which is connected therewith and extended backward and adapted to rest on a cross plate connected with the main frame, said bar being also provided with a chain which extends back and is adapted to be operated from the platform of the car, and said supplemental frame being also provided with a cross bar with which is connected a chain which extends backward and is connected with a spring which is secured to the rear end of the main truck or frame, said support and said chain being also connected with a sliding plate or frame which is adapted to be projected in front of the fender or guard
5 frame, substantially as shown and described.

In testimony that I claim the foregoing as my invention I have signed my name, in presence of the subscribing witnesses, this 25th day of July, 1895.

JACOB L. SCHUMAN.

Witnesses:
L. M. MULLER,
A. M. CUSACK.